United States Patent [19]

Flesher et al.

[11] 4,259,023
[45] Mar. 31, 1981

[54] APPARATUS AND PROCESS FOR MIXING OR REACTING INCOMPLETELY MISCIBLE PHASES

[75] Inventors: Peter Flesher, Bingley; Ian M. Johnson, Brighouse, both of England

[73] Assignee: Allied Colloids Limited, Bradford, England

[21] Appl. No.: 41,139

[22] Filed: May 21, 1979

[30] Foreign Application Priority Data

May 23, 1978 [GB] United Kingdom ............... 21296/78

[51] Int. Cl.³ .............................................. B01F 9/02
[52] U.S. Cl. ........................... 366/220; 260/29.6 RW; 264/8
[58] Field of Search .................................. 264/5, 9, 8; 260/29.6 RW, 95 R; 422/135; 526/78; 366/220, 131, 232, 348, 349

[56] References Cited

U.S. PATENT DOCUMENTS

| | | | |
|---|---|---|---|
| 2,069,731 | 2/1937 | Trumpler | 264/5 |
| 2,411,152 | 11/1946 | Folson | 264/5 |
| 2,464,187 | 3/1949 | Seaton | 264/8 |
| 2,694,700 | 11/1954 | Shanta | 422/135 |
| 3,003,986 | 10/1961 | Long | 422/135 |
| 3,215,506 | 11/1965 | Keil | 422/135 |
| 4,162,282 | 7/1979 | Fulwyer | 264/0.5 |

OTHER PUBLICATIONS

"Boundary Layer Theory" by Schlichting, pp. 500–502, 6th English Edition (translated by Kestin), published by McGraw Hill.

*Primary Examiner*—Robert W. Jenkins
*Attorney, Agent, or Firm*—Lawrence Rosen

[57] ABSTRACT

An incompletely miscible liquid mixture, e.g. a suspension polymerization mixture, is mixed by flowing through a rotating substantially horizontal tube that is incompletely filled with the mixture, so as to form pairs of vortices each with its axis transverse to the axis of the tube. The apparatus comprises the tube, that must be free of internal means for agitating the liquid within the tube, means for rotating the tube and means for feeding the liquid mixture to and through the tube.

6 Claims, 2 Drawing Figures

APPARATUS AND PROCESS FOR MIXING OR REACTING INCOMPLETELY MISCIBLE PHASES

There are many industrial processes in which contact between two or more incompletely miscible phases is necessary. Usually a reaction occurs at the interface between the phases but often it is merely required to mix two phases for a physical process to occur, as in a solvent extraction process. In other processes, one of the immiscible phases acts as a dispersion medium for the second phase which undergoes reaction, as in the suspension polymerisation process.

In the suspension polymerisation process, sometimes referred to as the pearl or bead polymerisation process, droplets of a polymerisable monomer or monomer solution are dispersed in an immiscible liquid and polymerised while suspended. Conventionally the dispersion has been formed by mechanical agitation in a batch stirred tank reactor and the agitation is continued as the droplets polymerise. However this method has a number of disadvantages, notably the difficulties involved in the formation of a uniform suspension of monomer droplets and the maintenance of the uniform suspension as the droplets polymerise, forming at one stage sticky particles which tend to agglomerate or adhere to the surfaces of the reactor. Furthermore it is necessary in a suspension polymerisation to ensure that good mixing is achieved: in a stirred tank reactor this conflicts with the requirement that after the initial dispersion of the monomer further breakdown of the droplets does not occur.

The theoretical advantages of continuous polymerisation are obvious and various continuous methods have been proposed. An example is in U.S. Pat. No. 2,694,700.

Often the known continuous methods have involved the use of a stirred tank reactor but this suffers from a lack of adequate control of the residence time of the particles in the reactor, and as a result it is not possible adequately to control the molecular weight distribution of the polymer.

It is known to conduct mixing by the creation of vortices without stirrers or baffles. For instance, in British Patent Specification No. 718,551 two immiscible liquid phases are mixed in a cylindrical chamber which is not rotated but in which a single strong vortex is created by tangential input of one or more of the liquids. In British Patent Specification Nos. 615,425 and 615,479 conversions involving two or more immiscible phases are carried out in the annular space between two surfaces of revolution one of which is rotated to produce Taylor vortices in the annular space, and it is disclosed that the method is suitable for polymerisation reactions. However during a suspension polymerisation process the density of the disperse phase can change considerably during reaction and the described methods, irrespective of whether they are operated with countercurrent or cocurrent flow, are not satisfactory in practice because of this change that occurs during the process.

In U.S. Pat. No. 3,003,986 a continuous emulsion polymerisation process is described in which Taylor rings are formed in a vertical apparatus fitted with an appropriate stirrer. The monomer to be polymerised and a stream of catalysts are passed in countercurrent flow through the stirring vessel. It is described in that specification that the Taylor rings consist of a flow pattern in which the liquid being stirred is segmented in planes perpendicular to the axis of the vessel and of rotation of the stirrer, with much higher rates of mass transfer within each segment than between such segments and with well defined boundaries separating the segments. However again the apparatus requires the provision of a stirrer and it is not suitable for suspension polymerisation.

It has been our object to devise an apparatus and method for thoroughly and controllably mixing a liquid mixture continuously, especially for conducting a polymerisation process.

A method according to the invention for continuously mixing a liquid mixture of a first liquid with an incompletely miscible second material comprises flowing the mixture continuously and without turbulence through a substantially horizontal tube that is incompletely filled with the liquid mixture while rotating the tube about its longitudinal axis at a rate such that pairs of counter rotating vortices, each with its axis substantially horizontal but transverse, e.g. substantially perpendicular, to the longitudinal axis of the tube, are formed in the liquid mixture.

Apparatus according to the invention comprises a substantially horizontal tube free of internal means for agitating the liquid within the tube, means for rotating the tube continuously about its longitudinal axis, means for supplying liquid continuously to one end of the tube, and means for withdrawing liquid from the other end of the tube, and means for maintaining the tube incompletely filled with liquid.

The invention is based in part on the surprising discovery that if a horizontal tube is incompletely filled with liquid and is rotated continuously about its longitudinal axis it is possible to form pairs of counter rotating vortices in the liquid, each with its axis substantially horizontal but transverse or even perpendicular to the longitudinal axis of the tube, provided the liquid is substantially non-turbulent. These vortices are somewhat similar to Taylor vortices, for instance as described in U.S. Pat. No. 3,003,986. By flowing the mixture continuously into the tube and continuously withdrawing it from the tube these vortices can thus be utilised to provide very desirable continuous mixing of the liquid mixture.

We find that in the invention it is easily possible to obtain flow conditions that are substantially plug flow conditions. Thus it is possible to achieve a much narrower distribution of residence times than is obtained in many prior systems, such as stirred tank reactors, devised for continuous mixing processes.

The stable mixing vortices are easiest to form when the height of the liquid in the cylinder is one third to one half of the cylinder diameter, but adequate mixing vortices can be formed with less and more liquid in the cylinder for example when the height of liquid is in the range of one quarter to three quarters of the diameter. The flow rate of liquid through the cylinder should be such that non-turbulent conditions are obtained.

Suitable rotation speeds can readily be determined and will depend on the flow rate of the liquids through the cylinder, their viscosity and the diameter of the cylinder. The flow pattern can readily be made visible and the minimum rotation speed required for stable vortex formation easily determined. The maximum rotation speed will be that at which turbulence commences, causing vortex mergeance and loss of plug flow characteristics.

Typical rotation speeds lie in the range 20–200 rpm, but speeds outside this range can be used depending on the size of the cylinder, and the viscosity and density of the phases employed.

Since the flow must be substantially non-turbulent it naturally follows that the apparatus must be free of internal means for agitating liquid within the tube. Thus the tube must have a substantially uninterrupted internal surface and should thus be cylindrical and substantially smooth and the surface and the entire tube should be free of baffles, mixers, screws or other fixed or movable parts conventionally included in mixing tubes.

Any liquid supply method may be used as the means for supplying the liquid to the tube and a simple overflow is suitable as the means for withdrawing it. It is necessary in the invention that the liquid mixture should only partially fill the tube and so the relative rates of supply and withdrawal of the liquid must be such as to achieve this. Conveniently the desired level of liquid is obtained by appropriate positioning of an overflow from the tube.

Although it is preferred that the column is used horizontally the vortices of the invention are still obtained when the column is tilted, either up or down by up to 20° but loss of vortex formation is observed in the portion of the tube that is then full.

The invention is suitable for the contacting and mixing of a wide range of incompletely miscible phases including two liquid phases, a liquid phase and a solid phase, and a gas phase and a liquid phase. Particular applications include solvent extraction processes, adsorption processes, leaching reactions and any other process involving the mixing of two incompletely miscible phases where control of contact time or shear or temperature is desirable. Normally the invention is applied to mixing different liquids. Materials of widely different densities can be mixed by merely adjusting the speed of rotation. The closer the densities of the two immiscible liquids the lower the rotation speed necessary for uniform mixing, producing a system of minimum shear ideal for suspension or emulsion polymerisations.

The invention is useful when the liquid mixture is an emulsion or, particularly, a suspension polymerisation mixture of a polymerisable phase and a continuous phase, the polymerisable phase being polymerised while the mixture flows through the tube. Usually the polymerisable material at the inlet to the tube is monomer, and it polymerises as it proceeds along the tube. Such processes can easily be conducted in the invention by forming mixing vortices that provide the mixing required during the process without allowing phase separation and without causing breakdown of the droplets. Further agglomeration of the particles and their adherence to the walls of the tube, i.e. the reactor walls, are greatly diminished compared with the stirred tank reactor.

The process of the present invention is particularly suitable for the polymerisation of water-soluble ethylenically unsaturated monomers such as acrylic acid, acrylamide and the dialkylaminoalkyl(meth)acrylates using water-in-oil suspension or emulsion polymerisation processes. Oil-in-water suspension or emulsion polymerisation processes may also be carried out in the reactor of the invention.

The monomer phase may be pre-dispersed in the continuous phase before entry to the reactor; this can be done in conventional fashion using a simple mixing device. Alternatively the dispersion may be formed inside the reactor prior to the mixing or reaction zone occupied by the mixing cells for example by use of atomizing nozzles.

The water-soluble ethylenically unsaturated monomers may be polymerised by a free radical mechanism as in a conventional polymerisation reaction using, for example, a redox initiator system such as potassium persulphate or tert butyl hydroperoxide with either sodium sulphite or sodium meta-bisulphite. Other initiator systems can also be used, e.g. ultra-violet light.

In one method of polymerisation according to the invention a stabiliser is added to the continuous phase to stabilise the suspension and this is fed together with the monomer phase with or without added initiator into a pre-disperser in which a stirrer is rotated at a speed sufficient to give the required particle size. The ratio of monomer phase to continuous phase is widely variable but is such that the dispersion contains from 5 to 75 percent of monomer phase. Initiators can be added to the reactor at one or more points along the flow path, for example when a redox system is used, one component may be dissolved in the monomer phase fed to the pre-disperser while the second component is dissolved in the continuous phase and pumped into the reactor at a suitable point. If the mixture to be polymerised is an emulsion, then an emulsifier is used instead of a suspension stabiliser.

The invention is illustrated in the accompanying drawings in which

Figure 1:
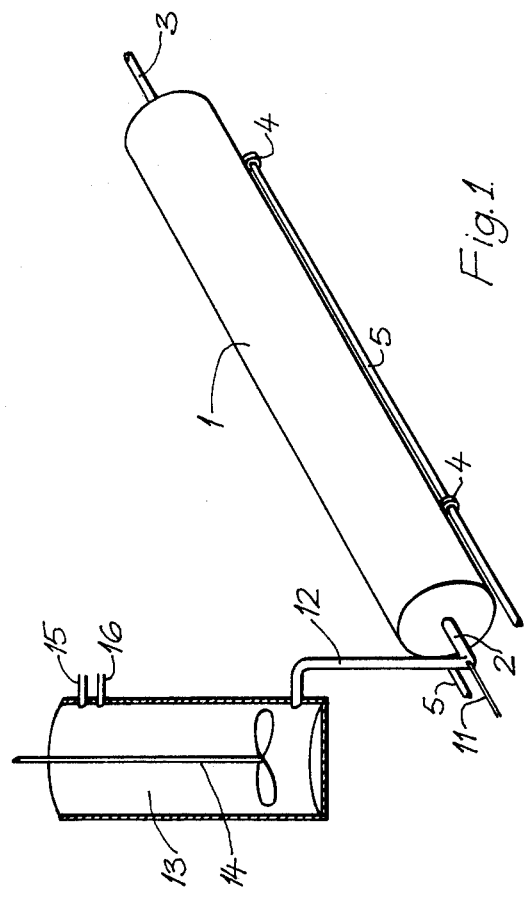
FIG. 1 is a perspective view of suitable apparatus.

The apparatus shown in FIG. 1 comprises a substantially horizontal tube 1 having an inlet pipe 2 and an outlet pipe 3, both positioned substantially on its longitudinal axis. The tube 1 is caused to rotate continuously about its longitudinal axis by a pair of sets of rubber wheels 4, each set being carried by a shaft 5 which is rotated continuously by a motor (not shown) while the wheels are pressed against the outer surface of the tube. Only one set is visible in the drawing. Appropriate bearings are provided around the inlet and outlet pipes 2 and 3.

Figure 2:
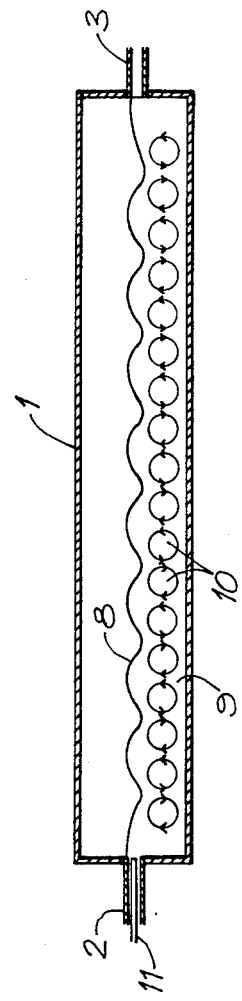
FIG. 2 is a diagrammatic representation of the liquid within the tube.

As shown in FIG. 2, when the tube is part filled with liquid 9 and rotated at an appropriate speed vortices 10 are formed in the tube. When appropriately contrasting liquids are used these vortices are visible with the naked eye and are seen to be regularly distributed along the tube and to have directions of rotation as shown by the arrows. The surface of the liquid is undulated, with peaks 8 being above the upflow of each vortex pair.

When the apparatus shown in FIG. 1 is used for conducting a polymerisation reaction the tube 1 is conveniently fed with initiator from a supply pipe 11 and a dispersion or emulsion of the polymerisation mixture from a supply pipe 12. This dispersion or emulsion may be fed from a pre-disperser 13 fitted with conventional dispersing means 14 and having inlets 15 and 16 for the monomer phase and the continuous phase respectively.

The following are examples of the invention when conducted for a polymerisation process using apparatus substantially as shown in FIG. 1.

EXAMPLE 1

Recipe

| Monomer phase | acrylamide solution |

|                   | -continued |
|-------------------|------------|
|                   | (50% solids) |
| Continuous phase  | Commercial xylene |
|                   | Stabiliser 0.1% wt. |
| Initiators        | 20 ppm tertiary-butyl |
|                   | hydroperoxide/min (based |
|                   | on monomer entering |
|                   | reactor per minute) |
|                   | 100 ppm Sodium meta- |
|                   | bisulphite (based on |
|                   | monomer) |

The solvent and monomer phases were degassed and the reactor, a horizontal cylinder of length 90 cm and diameter 5.1 cm, the predisperser and the tubing were flushed with nitrogen. The reactor was half filled with continuous phase pre-heated to 35° C. The bisulphite initiator was added to the degassed monomer and this and the pre-heated continuous phases pumped to the pre-disperser at flow rates of 14 ml and 30 ml/minute respectively.

The pre-dispersed mixture was then fed to one end of the cylinder which was rotated at 60 revolutions per minute. A solution of the hydroperoxide initiator in xylene was pumped into the reaction cylinder close to the point of entry of dispersion by means of a capillary tube.

Polymer beads were separated from the overflow at the other end of the reactor, washed in acetone and dried.

EXAMPLE 2

Using the recipe of Example 1 and the degassing procedure, a horizontal cylinder of length 150 cm and diameter 15 cm was half filled with continuous phase pre-heated to 35° C. The bisulphite initiator was added to the degassed monomer phase and this and the pre-heated continuous phase in a ratio of 1 to 3 pumped into the pre-disperser at a flow rate to give a residence time in the reactor of 15 minutes. The pre-dispersed mixture was fed to one end of the cylinder which was rotated at 52 revs per minute.

A solution of the hydroperoxide initiator was pumped into the reactor cylinder close to the point of entry of dispersion.

After running for 2 hours, during which time the outlet end reactor temperature varied between 48° C. and 66° C., a sample of the beads produced was taken. A 1% solution of the polymer had a viscosity of 106.2 cS (Suspended Level Viscometer). The free acrylamide content was 0.75% and average particle size was 552$\mu$.

We claim:

1. A method for continuously mixing a liquid mixture of a first liquid with an incompletely miscible second material and which comprises flowing the mixture continuously and without turbulence through a substantially horizontal tube that is incompletely filled with the liquid mixture while rotating the tube about its longitudinal axis at a rate such that pairs of counter rotating vortices, each with its axis substantially horizontal but transverse to the longitudinal axis of the tube, are formed in the liquid mixture.

2. A method according to claim 1 in which the liquid mixture is a suspension or emulsion polymerisation mixture of a polymerisable phase and a continuous phase and the polymerisable phase is polymerised while the mixture flows through the tube.

3. A method according to claim 2 in which initiator for polymerisation is introduced into the tube at one or more points along its length.

4. A method according to claim 2 in which the mixture is a dispersion or emulsion in oil of an aqueous phase formed from an aqueous solution of an ethylenically unsaturated monomer.

5. A method according to claim 4 in which the polymerisation mixture at the start of the tube is a dispersion of monomer phase in a continuous phase.

6. A method according to claim 1 in which liquid mixture is a suspension or emulsion polymerisation mixture of a polymerisable phase and a continuous phase, and the said mixture is preformed before being introduced into the tube and the polymerisable phase is polymerised while the mixture flows through the tube.

* * * * *